Figure 1:
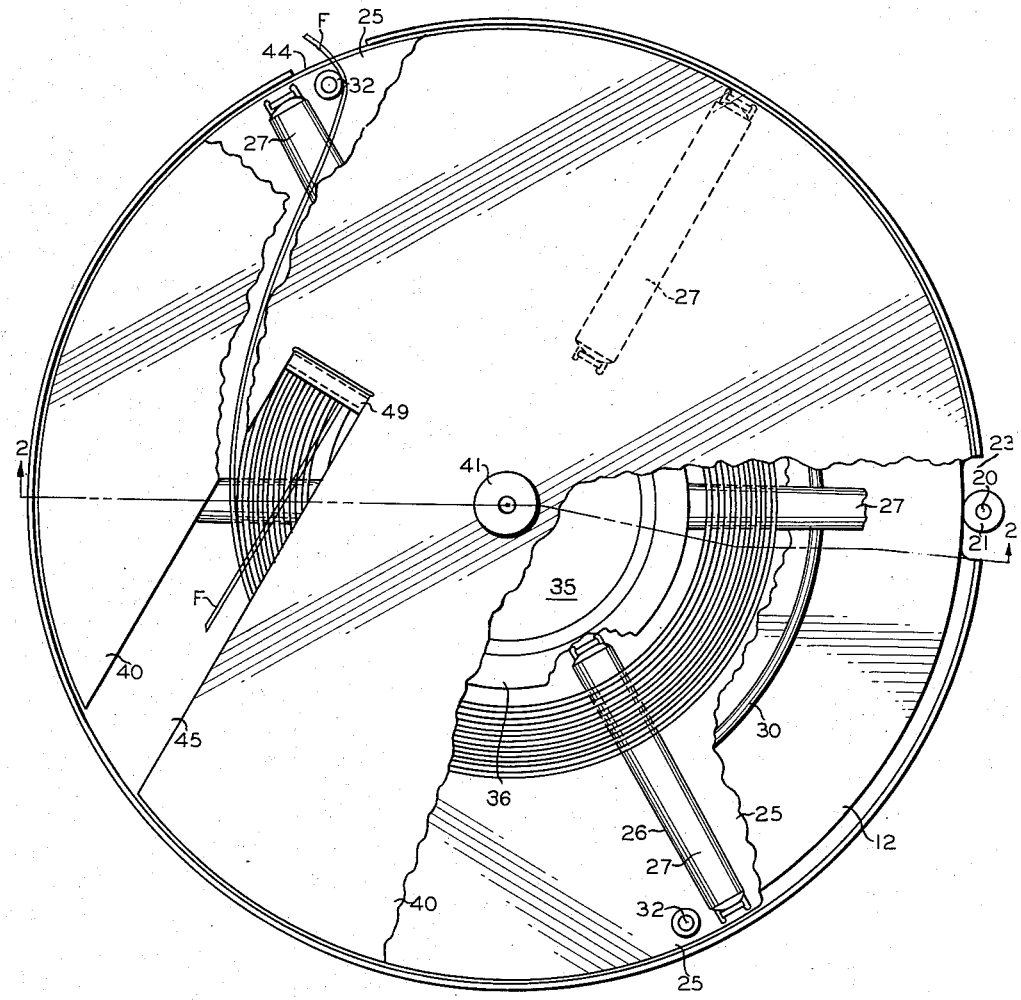

Dec. 13, 1960  A. H. GOREY  2,964,256
CONTINUOUS FILM MAGAZINE
Filed April 16, 1958

INVENTOR.
Archie H. Gorey
BY
ATTORNEY

2,964,256
CONTINUOUS FILM MAGAZINE

Archie H. Gorey, Irondequoit, N.Y., assignor to Graflex, Inc., Rochester, N.Y., a corporation of Delaware Filed Apr. 16, 1958, Ser. No. 728,891

2 Claims. (Cl. 242—55.19)

The present invention relates to film magazines, and more particularly to magazines for continuously winding up and feeding out endless motion picture film.

Magazines of this type are used for feeding film to and from a motion picture projector, where it is desired to repeatedly and continuously project film showing advertisements, cartoons, or the like. The magazine of this invention may be used, for instance, in connection with a motion picture film projector in a supermarket, at, for instance, the meat counter, where people have to wait their turns to be served, and where advertising film might be projected to interest them while they are waiting. It might also be used in a children's waiting room of a store where cartoons are continuously projected to interest the children while their mothers are shopping. Other uses will be obvious to those skilled in the art.

One object of the present invention is to provide a film magazine of the character described, in which a relatively long endless film may be retained, and to and from which the film may be fed with a minimum of wear and strain upon the film and with a minimum of damage to its surface.

Another object of the invention is to provide a film magazine of the character described which is simple in construction, reliable, and of relatively low cost.

Other objects of the invention will be apparent hereinafter from the specification and from the recital of the appended claims.

Figure 2:
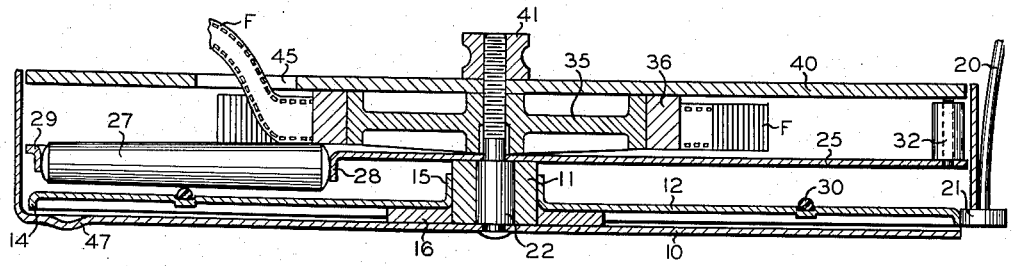

In the drawing:

Fig. 1 is a plan view, with parts broken away, showing a film magazine made according to one embodiment of this invention; and Fig. 2 is a section through this magazine taken on the line 2—2 of Fig. 1 looking in the direction of the arrows.

Referring now to the drawing by numerals of reference, 10 denotes the base of the magazine. This is cup-shaped, and is provided with a centrally disposed bearing 11, on which there is rotatably mounted a plate 12. This plate has a downturned peripheral flange 14, and a central hub portion 15. The hub portion is journaled on the bearing 11. A washer 16 is interposed between the plate 12 and the base 10, and serves to space the plate above the base.

The plate 12 is adapted to be driven in time with the motion picture projector by a flexible shaft 20 and a drive roller 21 which is secured to the shaft. The roller 21 projects through a slot 23 in the peripheral wall of the base 10 and drivingly engages the peripheral flange 14 of the plate 12.

Riveted to the base centrally thereof to project upwardly through the bore of the bearing 11 is a stud 22. Secured to the stud 22 above the bearing 11 is a plate 25 which is stationary. This plate carries a plurality of rollers 27. These are mounted in slots 26 in the plate, and are equiangularly spaced from one another, and are disposed radially of the axis of the stud 22. In the embodiment of the invention, shown there are six of the rollers 27, spaced 60° apart, about the axis of stud 22. Each of the rollers 27 is mounted at its inner end in a tab 28 that is struck downwardly from the plate 25; and each of the rollers is mounted on its outer end in a tab 29 also struck downwardly from the plate 25.

Mounted in a groove in the upper surface of the drive plate 12 is a neoprene or rubber drive ring 30 which is positioned to engage the rollers 27 and to rotate these rollers on their respective axes as the drive plate 12 rotates on its axis.

Secured to the plate 25 to project upwardly thereabove are a plurality of equiangularly spaced rollers 32. These are disposed around the periphery of the plate.

Keyed to the stud 22 above the plate 25 to seat against the upper face of the plate 25 is a hub 35 on which is mounted a ring 36. The ring 36 is preferably made of nylon or similar material which will not scratch the film, and so are the rollers 32, and the rollers 27.

A cover 40 is mounted above the hub 35 to close the upper end of the magazine. This cover is held in place by a nut 41 that is adapted to thread onto the upper threaded end of the stud 22.

The film is adapted to be fed from the motion picture projector through an opening 44 in the peripheral wall of the base 10 around one of the rollers 32 into the storage space between the cover 40 and the plate 25. The film feeds out of this storage space back to the projector through the slot 45 in the cover 40. The film rests on the rollers 27. In effect, these rollers form an antifriction floor for the magazine storage space. These rollers 27, which are driven by the ring 30 on the plate 12, keep the film from bunching up. The film will not be tight at one spot and loose at another. The rollers 27 are driven from roller 21 and ring 30 at the peripheral speed necessary to feed out and take up the amount of film demanded by the projector. With this construction, the smaller diameter inner coil of film feeding the projector will tend to feed out no more film than the outer larger diameter coil will take in, thereby greatly reducing the slipping and binding of the coils against one another. If the film rested directly on a driven plate, instead of on rollers 27, the outer coil of the film in the magazine being of larger diameter than the inner coil of the film would try to take up more film than the inner coil would feed out. This would cause a great deal of slipping and binding between coils. The rollers 27 may be cylindrical and of uniform diameter from end to end but are preferably made with a slight taper so as to be a few thousandths of an inch larger at their radially inner ends than at their radially outer ends. This will aid in proper winding of the film F in the storage space of the magazine.

The magazine of this invention can be used with any type of motion picture projector. The film is fed onto the magazine adjacent the periphery of the magazine; it is taken off close to the center of the magazine.

The magazine may be supported in any suitable manner. As indicated in Fig. 2, angularly spaced portions 47 may be struck down from the base to provide feet for supporting the magazine.

The cover 40 is preferably made of a clear, transparent plastic such as "Lucite." To avoid wear of the cover at the inner edge of the opening 45 therein, a guard 49 made of stainless steel may be crimped over the inner edge of the slot 45.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A magazine for storing and for continuously feeding film to and from a motion picture projector, comprising a housing, a plate secured in said housing against rotation, a hub upon which the film is wound, said hub being secured in said housing against rotation, a cover removably secured to said housing above said hub and said plate, a plurality of rollers upon which one of the edges of a film is adapted to rest, said rollers being journaled in said plate for rotation about their respective axes and being disposed radially of a common axis coinciding with the axis of said hub and being disposed in equiangularly spaced relation about said common axis, said housing having a peripheral slot therein through which film feeds into said magazine to form a series of convolutions winding from the outside inwardly about said hub, and said cover having a slot therethrough through which the film is fed away from the magazine after the film has traversed said series of convolutions.

2. A magazine for storing and for continuously feeding film to and from a motion picture projector, comprising a housing, a plate secured in said housing against rotation, a hub upon which the film is wound, said hub being disposed above said plate and being secured in said housing against rotation, a cover removably secured to said housing above said hub and said plate, a plurality of rollers upon which one of the edges of a film is adapted to rest, said rollers being journaled in said plate to extend radially of a common axis coinciding with the axis of said hub and said rollers being spaced in equiangular spaced relation about said common axis, and means for rotating said rollers on their respective axes comprising a second plate rotatably mounted in said housing coaxial with said common axis, a ring secured to said second plate coaxial with said common axis and frictionally engaging all said rollers, said second plate having a peripheral flange, a drive member engaging said peripheral flange to revolve said second plate, said housing having a peripheral slot therein through which film feeds into said magazine to form a series of convolutions winding from the outside inwardly about said hub, and said cover having a slot therethrough through which the film is fed away from the magazine after the film has traversed said series of convolutions.

References Cited in the file of this patent

UNITED STATES PATENTS

| | | |
|---|---|---|
| 1,639,469 | Scofield et al. | Aug. 16, 1927 |
| 1,716,774 | Halla | June 11, 1929 |
| 2,037,601 | Shirlow et al. | Apr. 14, 1936 |
| 2,398,639 | Heyer | Apr. 16, 1946 |
| 2,706,629 | Cailliot | Apr. 19, 1955 |
| 2,837,332 | Busch | June 3, 1958 |